United States Patent [19]

Seelig et al.

[11] 4,150,343

[45] Apr. 17, 1979

[54] METHOD FOR GENERATING LASER PULSES BY MEANS OF A GAS LASER AND APPARATUS FOR CARRYING OUT THE METHOD

[75] Inventors: Wolfgang H. Seelig, Bern; Michel A. Dufour, Muri; Hans Egger, Zuzwil, all of Switzerland

[73] Assignee: Lasag AG, Thun, Switzerland

[21] Appl. No.: 877,718

[22] Filed: Feb. 14, 1978

Related U.S. Application Data

[63] Continuation of Ser. No. 648,323.

[30] Foreign Application Priority Data

Jan. 10, 1975 [CH] Switzerland .................. 240/75

[51] Int. Cl.² ............................................. H01S 3/223
[52] U.S. Cl. ............................................. 331/94.5 G
[58] Field of Search ................. 331/94.5; 330/4.3; 313/217, 220

[56] References Cited

U.S. PATENT DOCUMENTS

| | | | |
|---|---|---|---|
| 3,476,969 | 11/1969 | Ennulat et al. | 313/220 |
| 3,813,615 | 5/1974 | Schrierer et al. | 331/94.5 G |
| 3,934,212 | 1/1976 | Javan et al. | 331/94.5 PE |

OTHER PUBLICATIONS

Adamchuk et al., *Optics and Spectroscopy*, vol. 33, No. 2, Aug. 1972, pp. 191–192.
Agirbiceanu et al., Chem. Abstracts, No. 53,5874i, vol. 53, No. 7, Apr. 10, 1959.

*Primary Examiner*—William L. Sikes
*Attorney, Agent, or Firm*—Sherman & Shalloway

[57] ABSTRACT

Laser pulses are generated by means of a gas laser in which a gas mixture containing carbon dioxide, nitrogen and helium is at every pulse exposed to an electrical discharge. To achieve a homogeneous discharge, the vapor of a metallocene is added to the gas mixture which prior to at least a first discharge is irradiated with a pulse of ultra-violet light.

16 Claims, 5 Drawing Figures

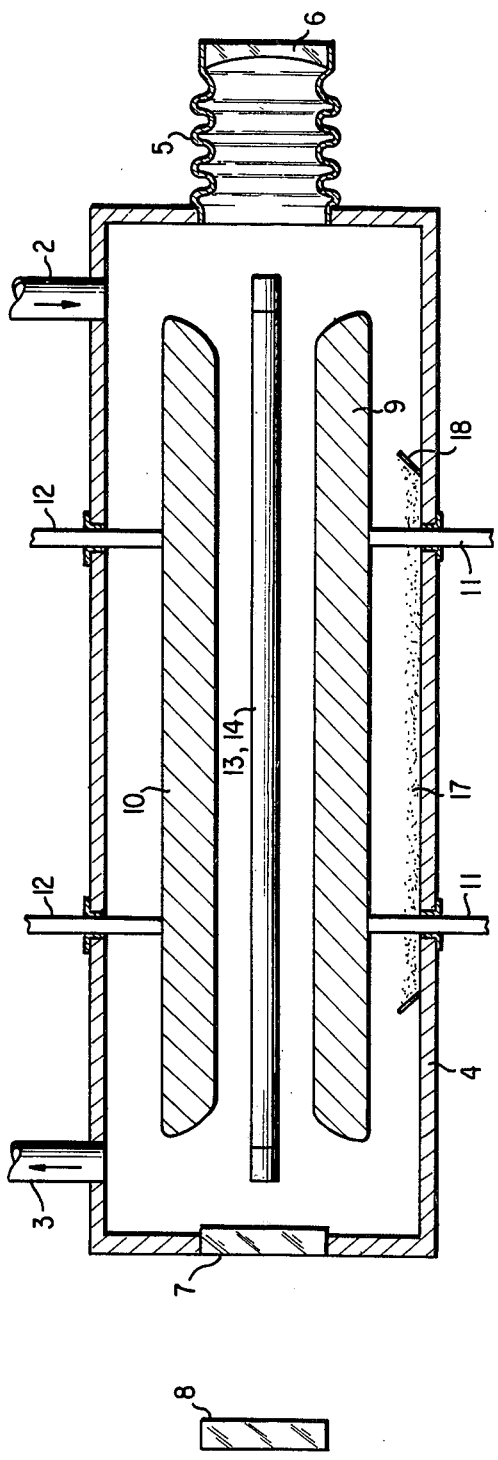
FIG.1
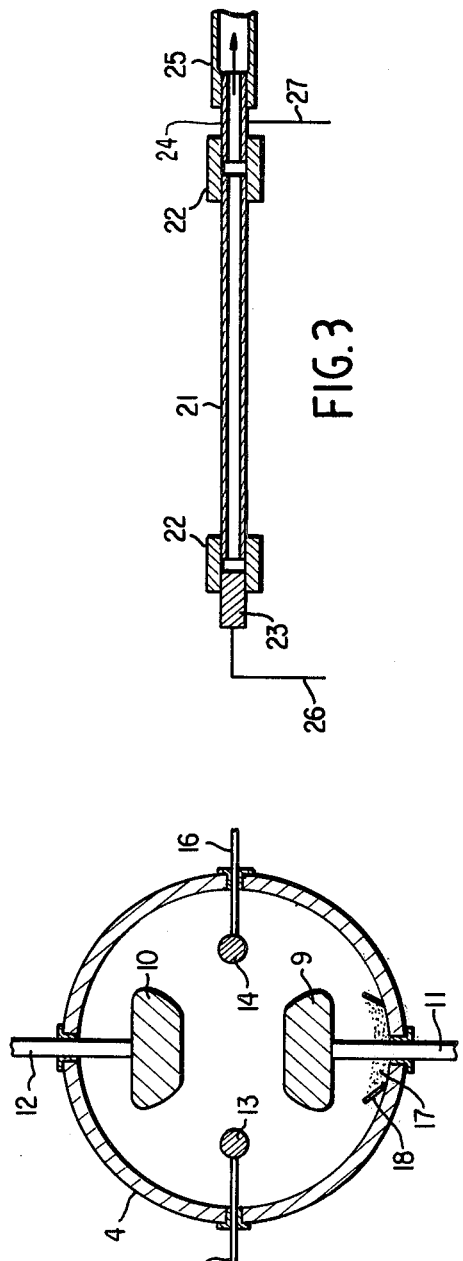
FIG.3
FIG.2

METHOD FOR GENERATING LASER PULSES BY MEANS OF A GAS LASER AND APPARATUS FOR CARRYING OUT THE METHOD

This is a continuation, of application Ser. No. 648,323, filed Jan. 12, 1976 and now abandoned.

BACKGROUND OF THE INVENTION

It is known that transversally excited gas lasers, containing carbon dioxide at atmospheric pressure, make it possible to generate laser beams of high energy. However, the use of such gas lasers is impossible in many cases because the energy is not uniformly radiated. The uniformity of radiation depends on the homogeneity of the electrical discharge. It is known to improve the homogeneity of the discharge by using a pre-ionization of the gaseous laser medium. Among various possibilities of pre-ionization, a photo-pre-ionization has been found highly effective.

A direct photo-ionization of carbon dioxide, nitrogen or helium molecules contained in the gas laser is conditional upon the photons having energies exceeding 14 eV. Such photons, at atmopsheric pressure, have a penetration depth limited to 30 microns, so that a space pre-ionizatin is not possible. In order to overcome this difficulty, supplementary substances with a low ionization potential can be used. This method has the great advantage that penetration depth of the photons is independent of the gas pressure and that, accordingly, a genuine space pre-ionization is possible at high gas pressures, too.

The choice of such a supplementary substance is, however, greatly limited by the following requirements:

The ionisation potential of the supplementary substance must be smaller than about 7 eV.
 The supplementary substance must have a high vapor pressure at room temperature.
 The supplementary substance and its possible decomposition products must not react with the laser gas and must not cause a reduction of the excited level.
 The supplementary substance and its possible decomposition products must be transparent to the laser light at its wavelength and must not disturb the electrical discharge.
 Furthermore, a light source of high power is needed which has powerful emission near the ionization energy of the supplementary substance.

Various supplementary substances have already been proposed. However, their ionization potentials are too high to permit a single-stage hoto-ionization.

SUMMARY OF THE INVENTION

The present invention provides a method for generating laser pulses by means of a gas laser, in which method a gas mixture containing carbon dioxide, nitrogen and helium is exposed at every pulse to an electrical discharge and wherein, to achieve a homogeneous discharge, a supplementary substance, pre-ionized by photo-ionization, is added to the gas mixture.

In accordance with the present invention a method is created, which combines a high vapor pressure of a supplementary substance with a low ionization potential and which also fulfills the above-mentioned requirements.

The process of the invention uses the vapor of a metallocene which is added to the gas mixture. Then the gas mixture intermixed with the metallocene vapor is irradiated, prior to at least a first discharge, by an ultra-violet light pulse.

The invention further provides an apparatus for carrying out the method defined above comprising a gas discharge tube containing the gas mixture, in which tube, in order to generate a homogeneous electrical field, two elongated electrodes are positioned at a distance from and parallel to the tube axis, which electrodes are connected to a controllable electrical pulse circuit and are also connected to resonators containing two mirrors situated along the tube axis, one each on each side of the gas discharge tube, of which one mirror is designed as a de-coupling mirror for the laser beam. According to the invention this apparatus contains at least one tubular ultra-violet light source which is placed in the gas discharge tube parallel to the electrodes, which light source is connected for its ignition to a further electrical pulse circuit. Further, means are provided in order to put the supplementary substance in contact with the gas mixture.

BRIEF DESCRIPTION OF THE DRAWING

FIG. 1 shows a diagrammatic longitudinal cross-section of a gas discharge tube used, by way of example, for carrying out the method according to the invention.

FIG. 2 shows a cross-section through the gas discharge tube along the line II—II in FIG. 1.

FIG. 3 shows a longitudinal cross-section of a low-pressure air discharge lamp used as an ultra-violet light source.

Figure 4:
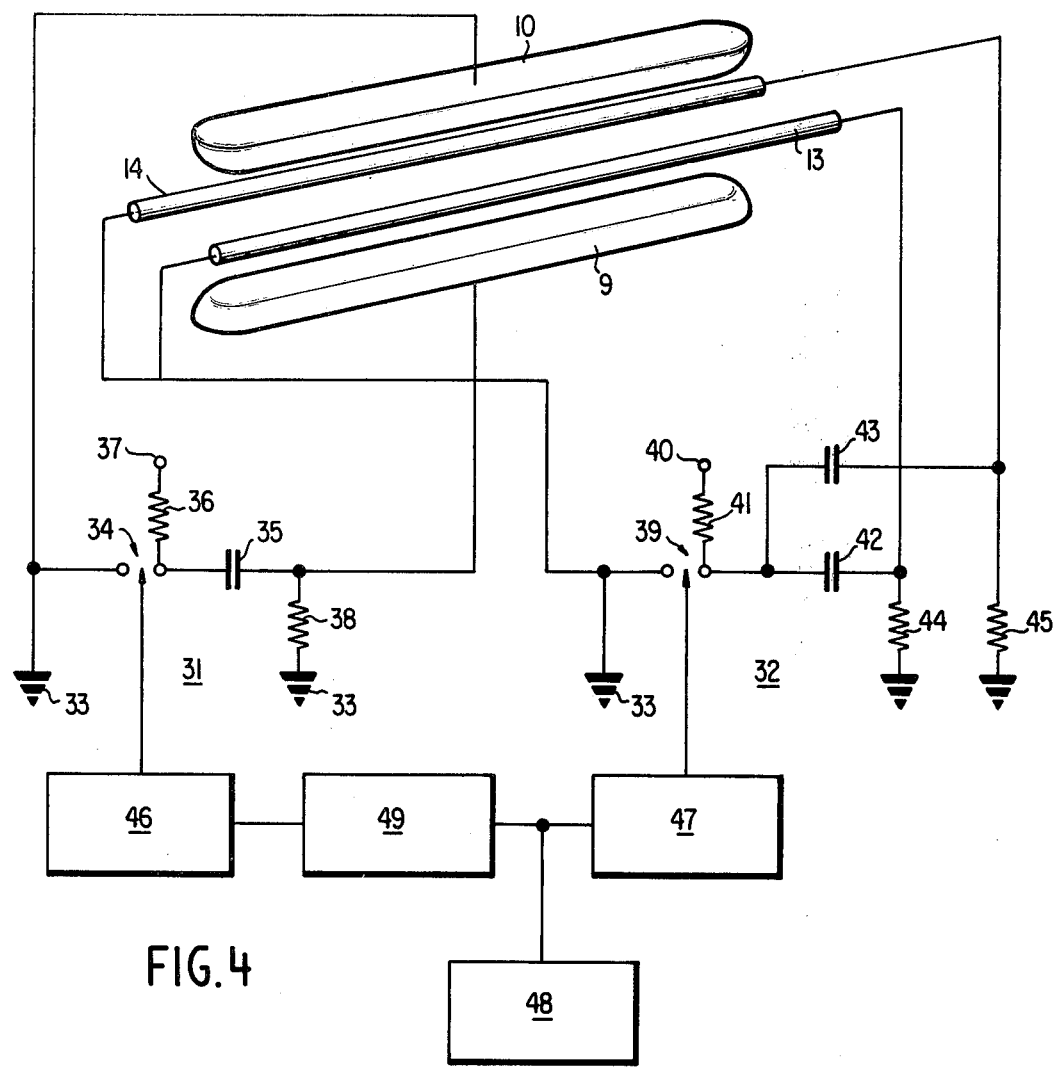
FIG. 4 shows a diagrammatic, partly perspective illustration of a gas discharge gap, of the ultra-violet light sources and of the associated pulse circuits.

Referring specifically to the drawing, examples of embodiments of the method according to the invention as well as examples of embodiments of the apparatus for carrying out the method are explained.

The gas discharge tube 1 shown in FIG. 1 has a jacket 4 which is closed except for an inlet socket 2 and an outlet socket 3 for the gas mixture containing the carbon dioxide, nitrogen and helium. The jacket 4 consists, for example, of a synthetic material such as "Plexiglas" (registered trade mark). At one end face of the jacket, which has an aperture, a fully reflecting mirror 6 is attached via a bellows 5. The mirror belongs to the optical resonator of the gas laser. The other end face of the jacket 4 is provided with a window 7 made, for example, of germanium. A further mirror 8 is placed outside the window 7 in the longitudinal axis of the gas discharge tube 1. The mirror 8 is partly transparent to light in order to decouple the generated laser beam. Mountings for the gas discharge tube 1 and the mirrors 6 and 8 are not shown in the diagrammatic illustration of FIGS. 1 and 2. Preferably, supports are used for this purpose which are arranged on an optical bench.

Two elongated electrodes 9 and 10 are placed inside the gas discharge tube 1, in parallel with and symmetrical to the longitudinal axis of the tube. The electrodes are attached to the jacket 4. Mountings 11 and 12 serve simultaneously as electrical connections to the pulse circuit, described later. The electrodes 9 and 10 have a shape, particularly a cross-sectional shape, such that, when a voltage is applied across the electrodes, the electrical field generated between the electrodes is as uniform as possible. Furthermore, two tubular ultra-violet light sources 13 and 14 are arranged inside the gas discharge tube 1, symmetrical to the electrodes 9 and 10. The mountings and electrical contacts 15 and 16 for the ultra-violet light sources are also fixed on the jacket 4. The supplementary substance 17 added, according to the invention, to the gas mixture, is injected in powdered form into the lower part of the jacket 4. A bowl-shaped shade 18 is provided in this arrangement.

The ultra-violet light sources may, for example, be tubes of fused synthetic quartz, filled with xenon, having a 50% transmission at 1800 Å. For gas discharge tubes of larger dimensions, it has been found advantageous to provide low-pressure air discharge lamps instead of xenon lamps, because the air discharge lamps are suitable for generating short pulses of abundant energy and, furthermore, they can be easily adapted to the length of the electrodes 9 and 10. These lamps are, in essence, black body emitters at a temperature between 20,000° and 30,000° K.

According to FIG. 3, a low-pressure air discharge lamp may consist of a quartz tube 21, with an inside diameter of, for example, 4 mm, which is provided on each side with an electrode 23 or 24, respectively, consisting, for example, of steel, attached via two short elastic cuffs 22, for example, rubber cuffs. One electrode 23 is formed as a cylindrical bolt and the other electrode 24, as a hollow cylinder. A pipeline 25, connected to a vacuum pump, is coupled to the hollow electrode. The quartz tube 21 is filled with air and evacuated down to a pressure of about 5 Torr. The electrodes 23 and 24 are connected, via electrical leads 26 and 27, to a pulse circuit which will be descibed below.

In FIG. 4, the electrodes 9 and 10 and the ultra-violet light sources 13 and 14 of the gas discharge tube 1 of FIG. 1, as well as one pulse circuit 31 and 32 each for feeding the electrodes and light sources, respectively, are illustrated diagrammatically. One electrode 10 is connected to the earth or frame 33 in the first pulse circuit 31. One terminal of a controllable spark gap 34 is also connected to earth 33. One terminal of a storage capacitor 35, which is connected, via a charging resistor 36, to a high-voltage source 37, not shown in detail, is also connected to the other terminal of the spark gap 34. The other terminal of the storage capacitor 35 is connected to the other electrode 9 and is also connected to earth 33 via a resistor 38.

The second pulse circuit 32 is built up in the same manner and thus comprises a controllable spark gap 39, common to both light sources 13 and 14, a charging resistor 41, connected to a high voltage source 40, as well as a capacitor 42 or 43, respectively, for each light source. The capacitors 42 and 43 are each connected to earth 33 via a resistor 44 or 45, respectively.

In order to ignite the spark gaps 34 and 39, one 25 kV trigger circuit 46 or 47, respectively, is provided for each circuit. To trigger off the trigger circuits 46 and 47, a common trigger pulse generator 48 is available, the output of which is directly connected to the spark gap 39 for the light sources 13 and 14 and is also connected, via an adjustable delay circuit 49, to the spark gap 34 for the electrodes 9 and 10. A trigger pulse from the generator 48 thus triggers off the trigger circuit 47 which ignites the spark gap 39 by a 25 kV pulse, so that the capacitors 42 and 43 discharge via the light sources 13 and 14 and, for a short time, ignite this spark gap. The same trigger pulse triggers off, after an adjustable delay, the trigger circuit 46, which, in turn, ignites the spark gap 34 by a 25 kV pulse, so that the capacitor 35 discharges, via the electrodes 9 and 10, i.e. causes an electrical discharge between the electrodes, which generates a laser pulse in the resonator 6, 8 of FIG. 1.

The supplementary substance introduced into the gas discharge tube 1 according to FIG. 1, which, according to the invention, is a metallocene, may advantageously be a ferrocene with an ionization energy of 6.8 eV or a nickelocene with an ionization energy of 6.8 eV. Both these energies are below the cut-off threshold of fused synthetic quartz, which may serve as a window material for the ultraviolet light source. Both ferrocene and nickelocene do not react with the carbon dioxide, nitrogen and helium containing laser gas mixture and, in their vapor state, have no measurable absorption at the wavelength of the laser light. At room temperature, their vapor pressure is about 0.5 Torr.

pre-ionization measurements were made with the gas discharge tube 1 illustrated in FIG. 1 and the pulse circuits 31 and 32 illustrated in FIG. 4. In these measurements, a single tubular xenon light source was positioned parallel to the electrodes 9 and 10, each of which was 20 cm long. The gas discharge tube 1 was filled with a mixture of carbon dioxide, nitrogen and helium in the ratio of 2—2-3. In the pulse circuit 32 of FIG. 4, the capacitors 42 and 43 had a capacity of 1 micro-farad each and the high voltage 40 amounted to 2.5 kV, whereby light pulses of 4 microseconds duration could be achieved.

With this apparatus, energy densities of up to 300 J/l could be achieved in the gas discharge tube at atmospheric pressure without arc formation, provided the xenon light source was ignited with an input energy of 3 J and provided ferrocene or nickelocene were added to the laser gas mixture mentioned above. If, instead of those supplementary substances, a supplementary substance hitherto considered advantageous was used, e.g. xylene or tri-n-propylamine, unavoidable arc discharge occured.

By providing the mirrors 6 and 8 of FIG. 1, reproducable laser pulses of the transversal electromagnetic (TE-$M_{oo}$)-mode with a duration of 75 nano-seconds were observed. The de-coupling energy density reached amounted to 30 J/l. The intensity distribution over the beam cross-section of the laser pulses can be measured by traversing with a pyro-electric detector. The measurement of the amplification for small signals by the threshold reflection yielded a value of about 3%/cm. If the apparatus of FIG. 1 is arranged in a high-pressure container, a laser emission can be observed at pressures of up to at least 5 atmospheres.

Instead of injecting the supplementary substance on to the inside wall of the gas discharge tube, it can also be added to the gas mixture flowing into the gas discharge tube. The device illustrated in FIG. 5 can be used for this purpose. This device is constructed essentially in the manner of a wash bottle. A container 51, e.g. a glass container, has an aperture closed by a plug 52. A first tube 53, which extends in the container 51 down to its bottom, and a second tube 54, which opens out into the container immediately behind the plug 52, are led through the plug 52. A quantity of powdered supplementary substance 55 is injected on to the bottom of the container. The gas mixture flowing through the tube 53 into the container 51 traverses the supplementary substance 55 and absorbs its vapor. The gas mixture intermixed with the vapor of the supplementary substance 55 flows via the tube 54 into the gas discharge tube, which may be shaped, for example, as in FIG. 1 and which no longer contains the supplementary substance indicated in FIG. 1.

Figure 5:
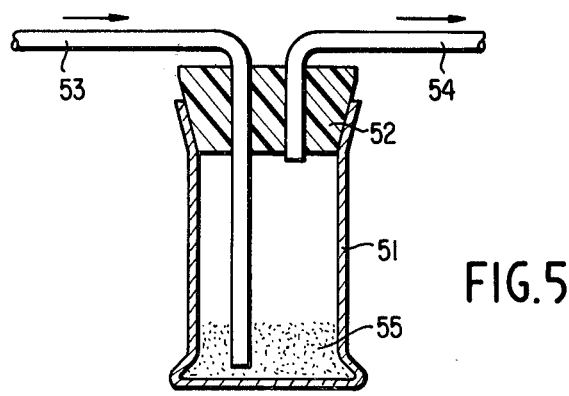
FIG. 5 shows a cross-section through apparatus for the purpose of adding the supplementary substance to the gas mixture flowing into the gas discharge tube.

If the supplementary substance provided for is liquid at room temperature, its vapor can also be intermixed with the gas mixture by means of the device according to FIG. 5. A gaseous supplementary substance can be injected into the gas mixture directly before its entry into the gas discharge tube.

It has been found that, other supplementary substances than those mentioned above may be added to the gas mixture advantageously, for example, pentacene according to the formula:

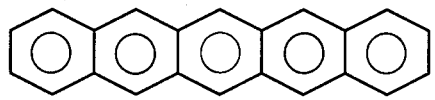

which has an ionization potential of 6.7 eV and is usually available in the form of crystal needles, which can be pulverised.

Furthermore, p-phenylene-diamine according to the formula:

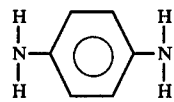

with an ionization potential of 6.75 eV, available in the form of solid crystals, has been found suitable.

In addition, tetra-methyl-p-phenylene-diamine, according to the formula:

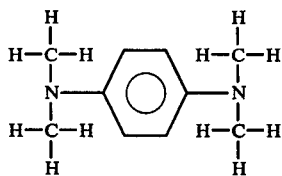

with an ionization potential of 6.6 eV, normally available in the form of flakes which can be pulverised, may be used as a supplementary substance.

We claim:

1. In a method for generating laser pulses in a gas laser employing single stage photon ionization including a gas mixture containing carbon dioxide, nitrogen and helium and a seed gas or vapor distributed in said gas mixture by the steps of
   directing at said gas mixture light having ionized photons for ionizing said seed substances, and said photons having an energy which is equal or greater than the lowest ionization potential of the seed gas,
   applying to said gas mixture a voltage to produce a plasma energized to create a population inversion in said gas mixture, stimulating emission of coherent radiation therein and, exposing the gas mixture at every pulse to an electrical discharge,
   the improvement comprising using as said seed vapor the vapor of metallocene having a lowest ionization potential below a cut-off of the photon absorption band of said gas mixture and irradiating the gas mixture and metallocene vapor prior to at least the first electrical discharge to a pulse of ultraviolet light emitting ionizing photons of an energy which is equal to or greater than the lowest ionization potential of said metallocene and than the cut-off of the photon absorption band of said gas mixture creating uniform single stage-photon ionization throughout said gas mixture, whereby a homogeneous electrical discharge is obtained.

2. The method of claim 1 in which said metallocene vapor is ferrocene vapor.

3. The method of claim 1 in which said metallocene vapor is nickelocene vapor.

4. The method of claim 1 in which the metallocene vapor is produced from a metallocene powder added to the gas mixture flow fed to the gas laser.

5. The method of claim 1 in which the metallocene vapor produced from a metallocene powder is placed on the wall of a gas discharge tube of the gas laser traversed by the gas mixture.

6. A laser beam generating apparatus employing single stage photon ionization comprising a gas discharge tube containing a lasing gas mixture comprised of carbon dioxide and a metallocene seed substance having a lowest ionization potential below the cut-off of the photon absorption band of said gas mixture, in which gas discharge tube, in order to generate a uniform electrical field, two elongated electrodes are placed at a distance from and in parallel to the tube axis, which electrodes are connected to a controllable electrical pulse circuit and to create a population inversion in said lasing gas mixture, and a resonator containing two mirrors arranged along the tube axis, one each on each side of the gas discharge tube, of which one mirror is designed as a decoupling mirror for laser beam, at least one tubular ultra-violet light source emitting ionizing photons of an energy which is equal to or greater than the lowest ionization potential of said metallocene and than the cut-off of the photon absorption band of said gas mixture positioned in the gas discharge tube parallel to the electrodes, which light source is connected for its ignition to an additional electrical pulse circuit and means for introducing said metallocene seed substance in contact with the lasing gas mixture.

7. The apparatus of claim 6 in which two tubular ultra-violet light sources are arranged in the gas discharge tube symmetrically to the electrodes.

8. The apparatus of claim 7 in which each ultra-violet light source is a low-pressure air discharge lamp.

9. The apparatus of claim 8 in which the ultra-violet lamp comprises a quartz tube which has at its one end a first electrode terminating the quartz tube and joined to the quartz tube via a cuff e.g. a rubber sleeve, and, at its other end, a second hollow electrode also joined to the quartz tube via a cuff and in which apparatus the second electrode is connected to a vacuum pump.

10. The apparatus of claim 7 in which each ultra-violet light source is a xenon flash lamp.

11. The apparatus of claim 6 in which an open container for the powdered supplementary substance is arranged in the gas discharge tube, which rests on the inner wall.

12. The apparatus of claim 6 in which the gas discharge tube has an inlet and an outlet for the gas mixture, and a container containing said metallocene seed substance arranged ahead of and in fluid flow communication with the inlet to the gas discharge tube, and in fluid flow communication with a source of the gas mixture whereby the gas mixture is adapted to flow through the metallocene seed substance and carry said seed substance into said gas discharge tube.

13. The apparatus of claim 6 in which both electrical pulse circuits contain a storage capacitor connected, on the one hand, to a high-voltage source and a spark gap and, on the other hand, to one of the electrodes or to the ultra-violet light source, respectively, and in which apparatus switch means are provided in order to ignite the spark gap associated with the light source immediately before the spark gap associated with the electrode.

14. The apparatus of claim 13 in which a trigger pulse generator feeds a first high-voltage trigger circuit for the spark gap associated with the ultra-violet light source and, via a delay circuit, feeds a second high-voltage trigger circuit for the spark gap associated with the electrodes.

15. A gas laser employing single stage photon ionization comprising an optical resonant cavity a volume of a lasing gas mixture comprising carbon dioxide, nitrogen, helium and the vapor of a metallocene in a tube, means to apply a voltage to produce a discharge to create a population inversion in said gas mixture and means for stimulating the emission of a coherent radiation in the tube.

16. The gas laser of claim 15 wherein said metallocene is ferrocene or nickelocene.

* * * * *